(12) United States Patent
Sydir et al.

(10) Patent No.: US 7,529,924 B2
(45) Date of Patent: May 5, 2009

(54) METHOD AND APPARATUS FOR ALIGNING CIPHERED DATA

(75) Inventors: Jaroslaw Sydir, San Jose, CA (US); Kamal J. Koshy, Milpitas, CA (US); Wajdi Feghali, Boston, MA (US); Bradley A. Burres, Cambridge, MA (US); Gilbert M. Wolrich, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 776 days.

(21) Appl. No.: 10/749,035

(22) Filed: Dec. 30, 2003

(65) Prior Publication Data

US 2005/0149725 A1 Jul. 7, 2005

(51) Int. Cl.
*H04L 9/00* (2006.01)

(52) U.S. Cl. .................. 713/153; 713/160; 713/189; 726/11; 726/12

(58) Field of Classification Search .......... 713/160, 713/375, 189, 151–154, 168–170, 190; 380/28–30, 380/37, 42, 255–257; 726/11–14; 709/230–235, 709/238; 370/351–357, 218, 360, 386, 389, 370/391, 395, 395.1, 395.7, 395.72, 400, 370/413, 415, 417, 419
See application file for complete search history.

(56) References Cited

U.S. PATENT DOCUMENTS

| | | | |
|---|---|---|---|
| 3,627,928 A * | 12/1971 | Wolper et al. | 380/43 |
| 3,868,631 A * | 2/1975 | Morgan et al. | 380/2 |
| 4,107,458 A * | 8/1978 | Constant | 380/37 |
| 4,434,322 A * | 2/1984 | Ferrell | 380/43 |
| 4,661,657 A * | 4/1987 | Grenzebach et al. | 713/160 |
| 5,070,528 A | 12/1991 | Hawe et al. | 380/48 |
| 5,161,193 A | 11/1992 | Lampson et al. | 380/49 |
| 5,235,644 A | 8/1993 | Gupta et al. | 380/48 |
| 5,307,459 A * | 4/1994 | Petersen et al. | 709/250 |
| 5,377,270 A | 12/1994 | Koopman, Jr. et al. | |
| 5,592,679 A | 1/1997 | Yung | |
| 5,594,869 A | 1/1997 | Hawe et al. | 395/200.2 |
| 5,790,545 A * | 8/1998 | Holt et al. | 370/398 |
| 5,860,072 A * | 1/1999 | Schofield | 707/101 |
| 6,061,449 A * | 5/2000 | Candelore et al. | 380/28 |
| 6,061,779 A * | 5/2000 | Garde | 712/204 |

(Continued)

FOREIGN PATENT DOCUMENTS

WO    WO 9966678 A1 * 12/1999

OTHER PUBLICATIONS

Pereira, R. et al., "The ESP CBC-Mode Cipher Algorithms," 1998. Networking Group Request for Comments #2451. 14 Pages. Retrieved from http://www.ietf.org/rfc/rfc2451.txt.*

(Continued)

*Primary Examiner*—Kimyen Vu
*Assistant Examiner*—Nirav Patel
(74) *Attorney, Agent, or Firm*—Daly, Crowley, Mofford & Durkee, LLP

(57) ABSTRACT

A data processing device includes a crypto unit having an alignment buffer for providing data to transmit buffer elements of a media switch fabric in multiples of a predetermined number of bytes. Ciphered data for a packet can be split over first and second transmit buffer elements so as to reduce the amount of software intervention.

13 Claims, 8 Drawing Sheets

U.S. PATENT DOCUMENTS

| | | | | |
|---|---|---|---|---|
| 6,064,976 | A | 5/2000 | Tolopka | 705/9 |
| 6,105,053 | A | 8/2000 | Kimmel | |
| 6,157,955 | A * | 12/2000 | Narad et al. | 709/228 |
| 6,295,604 | B1 | 9/2001 | Callum | 713/60 |
| 6,341,335 | B1 * | 1/2002 | Kanai et al. | 711/137 |
| 6,363,444 | B1 | 3/2002 | Platko et al. | |
| 6,477,646 | B1 * | 11/2002 | Krishna et al. | 713/189 |
| 6,557,095 | B1 | 4/2003 | Henstrom | 712/216 |
| 6,606,692 | B2 | 8/2003 | Hill et al. | 711/158 |
| 6,625,150 | B1 * | 9/2003 | Yu | 370/389 |
| 6,697,932 | B1 | 2/2004 | Yoaz et al. | |
| 6,757,791 | B1 * | 6/2004 | O'Grady et al. | 711/154 |
| 6,829,315 | B1 * | 12/2004 | Cruikshank | 375/354 |
| 6,853,635 | B1 * | 2/2005 | Beshai | 370/351 |
| 6,868,082 | B1 * | 3/2005 | Allen et al. | 370/360 |
| 6,971,006 | B2 | 11/2005 | Krishna et al. | |
| 7,069,447 | B1 | 6/2006 | Corder | |
| 7,073,067 | B2 | 7/2006 | Mizrah | |
| 7,082,534 | B2 | 7/2006 | Tardo | |
| 7,245,616 | B1 * | 7/2007 | Elnathan et al. | 370/389 |
| 2002/0035681 | A1 | 3/2002 | Maturana et al. | 713/151 |
| 2002/0078342 | A1 * | 6/2002 | Matthews, Jr. | 713/151 |
| 2002/0083317 | A1 | 6/2002 | Ohta et al. | |
| 2002/0184487 | A1 | 12/2002 | Badamo et al. | 713/153 |
| 2002/0188839 | A1 * | 12/2002 | Noehring et al. | 713/153 |
| 2002/0188871 | A1 | 12/2002 | Noehring et al. | 713/201 |
| 2002/0188885 | A1 | 12/2002 | Sihlbom et al. | |
| 2003/0002509 | A1 * | 1/2003 | Vandenhoudt et al. | 370/395.72 |
| 2003/0046423 | A1 * | 3/2003 | Narad et al. | 709/238 |
| 2003/0091036 | A1 * | 5/2003 | Milliken et al. | 370/354 |
| 2003/0097481 | A1 * | 5/2003 | Richter | 709/251 |
| 2003/0099254 | A1 * | 5/2003 | Richter | 370/466 |
| 2003/0135711 | A1 | 7/2003 | Shoemaker et al. | 712/200 |
| 2003/0169877 | A1 | 9/2003 | Liu et al. | 380/28 |
| 2003/0172104 | A1 | 9/2003 | Hooman et al. | 718/103 |
| 2003/0200330 | A1 * | 10/2003 | Oelke et al. | 709/238 |
| 2004/0004964 | A1 * | 1/2004 | Lakshmanamurthy et al. | 370/394 |
| 2004/0019782 | A1 | 1/2004 | Hawkes et al. | |
| 2004/0019783 | A1 | 1/2004 | Hawkes et al. | |
| 2004/0039936 | A1 | 2/2004 | Lai | |
| 2004/0117642 | A1 | 6/2004 | Mowery et al. | |
| 2004/0148382 | A1 * | 7/2004 | Narad et al. | 709/223 |
| 2004/0225885 | A1 * | 11/2004 | Grohoski et al. | 713/189 |
| 2004/0264502 | A1 * | 12/2004 | Hulmani et al. | 370/469 |
| 2005/0138368 | A1 * | 6/2005 | Sydir et al. | 713/161 |
| 2005/0141715 | A1 * | 6/2005 | Sydir et al. | 380/255 |
| 2005/0149744 | A1 * | 7/2005 | Sydir et al. | 713/189 |

OTHER PUBLICATIONS

Acharya, Mithun et al., "Secure Comparison of Encrypted Data in Wireless Sensor Networks," 2002. IST. 7 pages. Retrieved from http://ieeexplore.ieee.org/iel5/9729/30707/01421090.pdf?amumber=1421090.*

Chou, Wesley, "Inside SSL: Accelerating Secure Transactions," Sep. 2002. IEEE IT Pro. pp. 37-41. Retrieved from http://ieeexplore.ieee.org/iel5/6294/22323/01041177.pdf?tp=&amumber=1041177&isnumber=22323.*

Ramaswamy, R. et al., "Considering Processing Cost in Network Simulations," Aug. 2003. ACM SIGCOMM Workshop. pp. 47-56. Retrieved from http://delivery.acm.org/10.1145/950000/944782/p47-ramaswamy.pdf?key1=944782&key2=1789325611&coll=&dl=ACM&CFID=15151515&CFTOKEN=6184618.*

Venkatachalam, M. et al., "Integrated Data and Control Plane Processing Using Intel(R) IXP23XX Network Processors," Feb. 2005. Technology at Intel Magazine. 11 pages. Retrieved from http://www.intel.com/technology/magazine/computing/IXP23XX-network-processors-0205.pdf.*

"Product Brief: Intel IXP2855 Network Processor," 2005. Intel Corporation. 8 Pages. Retrieved from ftp://download.intel.com/design/network/ProdBrf/30943001.pdf.*

"System Packet Interface Level 4 (SPI-4) Phase 2 Revision 1: OC-192 System Interface for Physical and Link Layer Devices," Oct. 15, 2003. Optical Internetworking Forum. 72 pages. Retrieved from http://www.oiforum.com/public/documents/OIF-SPI4-2.01.pdf.*

Bergen, Chris, et al., "Streaming Interface (NPSI) Implementation Agreement," Oct. 18, 2002. The Network Processing Forum. 87 pages. Retrieved from http://www.oiforum.com/public/documents/HWStreamingIA.pdf.*

Palkert, Tom, et al., "Optical Internetworking Forum Report," Nov. 4, 1999. Network Elements Incorporated. 15 pages. Retrieved from ttp://www.ieee802.org/3/10G_study/public/nov99/palkert_1_1199.pdf.*

"Context Switch," Dec. 18, 1996. Free On-Line Dictionary of Computing. 1 page. Retrieved from http://foldoc.org/?query=context+switch.*

"Saturn(R) User Network Interface for 9.953 Gbit/s," 2001. PMC-Sierra. 2 pages.*

"Ultra High Speed ASIC Network Technology that Fully Conforms to International Standard Interface," 2002. FIND vol. 20, No. 3. 6 pages.*

"Network Process Forum—Streaming Interface (NPSI) Implementation Agreement" Oct. 18, 2002.*

"Intel IXP2850 Network Processor: High-Speed, Secure Content Processing in a Single Chip", *Intel Corporation 2002*, http://www.intel.com/design/network/prodbrf/25213601.pdf,1-6.

"Product Brief: Intel IXP2855 Network Processor", *Intel Corporation*: intel.com/go/networkprocessors, (2005),8.

"System Packet Interface Level 4 (SPL-4) Phase 2 Revision 1: OC-192 System Interface for Physical and Link Layer Devices", *Optical Internetworking Forum*, (Oct. 15, 2003),72.

Acharya, M., et al., "Secure Comparison of Encrypted Data in Wireless Sensor Networks", (2002),7.

Bergen, C., et al., "Streaming Interface (NPSI) Implementation Agreement", *The Network Processing Forum*, (Oct. 18, 2002),87.

Chou, W., "Inside SSL: Accelerating Secure Transactions", *IEEE, IT PRO*, (Sep. 2002),37-41.

Palker, T., "Optical Internetworking Forum Report", *Network Elements Incorporated*, (Nov. 4, 1999),15.

Pereira, R., et al., "The ESP CBC-Mode Cipher Algorithms", *Network Working Group Request for Comments: 2451*; http://www.ietf.org/rfc/rfc/rfc2451.txt., (Nov. 1998),14.

Ramaswamy, R., et al., "Considering Procesing Cost in Network Simulations", *ACM SIGCOMM Workshop*, (Aug. 2003),47-56.

Venkatachalam, M., "Integrated Data and Control Plane Processing Using Intel(R) IXP23XX Network Processors", *Technology@Intel Magazine*, (Feb. 2005),11.

* cited by examiner

METHOD AND APPARATUS FOR ALIGNING CIPHERED DATA

CROSS REFERENCE TO RELATED APPLICATIONS

Not Applicable.

STATEMENT REGARDING FEDERALLY SPONSORED RESEARCH

Not Applicable.

FIELD OF THE INVENTION

The embodiments disclosed herein relate generally to network processors and, more particularly, to network processors having cryptographic processing.

BACKGROUND OF THE INVENTION

As is known in the art, there is a trend to provide network processors that perform cryptographic processing of packet data. To facilitate cryptographic processing, network processors include cryptographic acceleration units (also referred to as "crypto units"). The crypto units accelerate the cryptographic processing of packet data to support cryptographic processing at line rate. One example of a network processor including such a crypto unit is the Intel IXP2850 network processor manufactured by Intel Corporation of Santa Clara, Calif.

Two types of cryptographic processing that are commonly performed on packet data are authentication processing (or more simply authentication) and ciphering processing (or more simply ciphering). Authentication is the process of creating a digest of the packet, which is sent along with the packet, to allow the receiver to verify that the packet was indeed sent by the sender (rather than by some third party) and was not modified in transit. Ciphering is the process of encrypting the packet, so that only the intended receiver, with the correct cryptographic key, can decrypt the packet and read its contents. Most commonly used security protocols perform both ciphering and authentication on each packet.

The crypto units in the Intel IXP2850 network processor, for example, implement the well-known 3DES/DES (Data Encryption Standard) and AES (Advanced Encryption Standard) cipher algorithms, as well as the SHA1 (Secure Hash Algorithm authentication algorithm). Each of the crypto units contains a pair of 3DES/DES and SHA1 cores, and a single AES core. By implementing a pair of cores, the crypto units meet the data rate requirements by allowing both cores to process data in parallel, thereby doubling the data rate of a single core.

Data from the crypto units is transferred to a transmit buffer element in a media switch fabric interface of the processor and then transmitted over an interface, such as an SPI4.2 or NPSI interface. SPI4.2 (Optical Internetworking Forum (OIF) standard System Packet Interface level 4, Phase 2, published January, 2001) is an industry standard interface commonly used to interconnect MAC (Media Access Controller)/framer devices to network processors. NPSI (Network Processing Forum (NPF) Streaming Interface, September, 2002) is a related interface that is used for transmitting data between network processors. Data is transmitted over the SPI4.2/NPSI interfaces in blocks, referred to as mpackets. Protocol packets, such as IP (Internet Protocol) packets or Ethernet frames, are split into multiple mpackets. The amount of data within an mpacket is a multiple of 16 bytes, unless the mpacket is the last mpacket in a packet.

When block cipher algorithms such as AES and 3DES/DES are used, data is processed by the crypto unit in fixed size blocks and upon processing is transferred in fixed sized blocks into buffer elements of predetermined size. Because data in an mpacket must be a multiple of 16 bytes, all of the data from the last block may not fit into a given buffer element because the resulting data in the buffer element would not be a multiple of 16 bytes. In this case, the data would need to be split among multiple buffer elements. Software control over this splitting process can increase the processing overhead.

It would, therefore, be desirable to overcome the aforesaid and other disadvantages.

BRIEF DESCRIPTION OF THE DRAWINGS

The presently disclosed embodiments will be more fully understood from the following detailed description taken in conjunction with the accompanying drawings, in which.

DETAILED DESCRIPTION OF THE INVENTION

Figure 1:
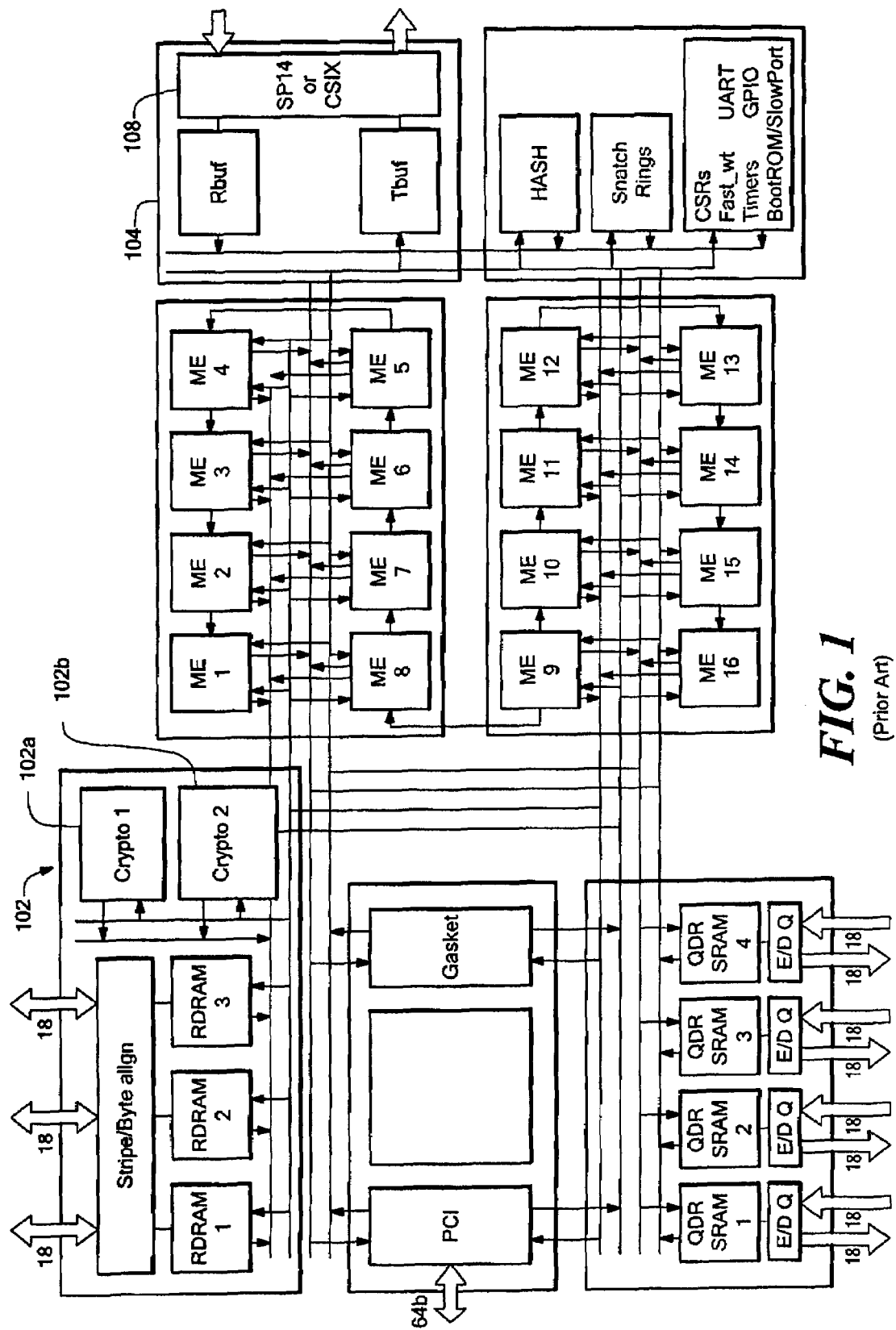
FIG. 1 is a schematic depiction of a portion of an exemplary network processor having cryptographic processing including an alignment buffer in accordance with the presently disclosed embodiments.

FIG. 1 shows an exemplary network processor 100 having a crypto system 102 with first and second cryptography algorithm acceleration (crypto) units 102a, 102b that transmit data in blocks to a Media Switch Fabric (MSF) unit 104 via an alignment buffer in accordance with the embodiments disclosed herein. The MSF unit 104 handles the transmission of data over an interface 108, such as an SPI4.2/NPSI interface.

It is understood that for ease of comprehension and clarity components of the network processor 100 not relevant to the features described herein may not be shown or described. It is further understood that such components are well known to one of ordinary skill in the art.

Figure 1A:
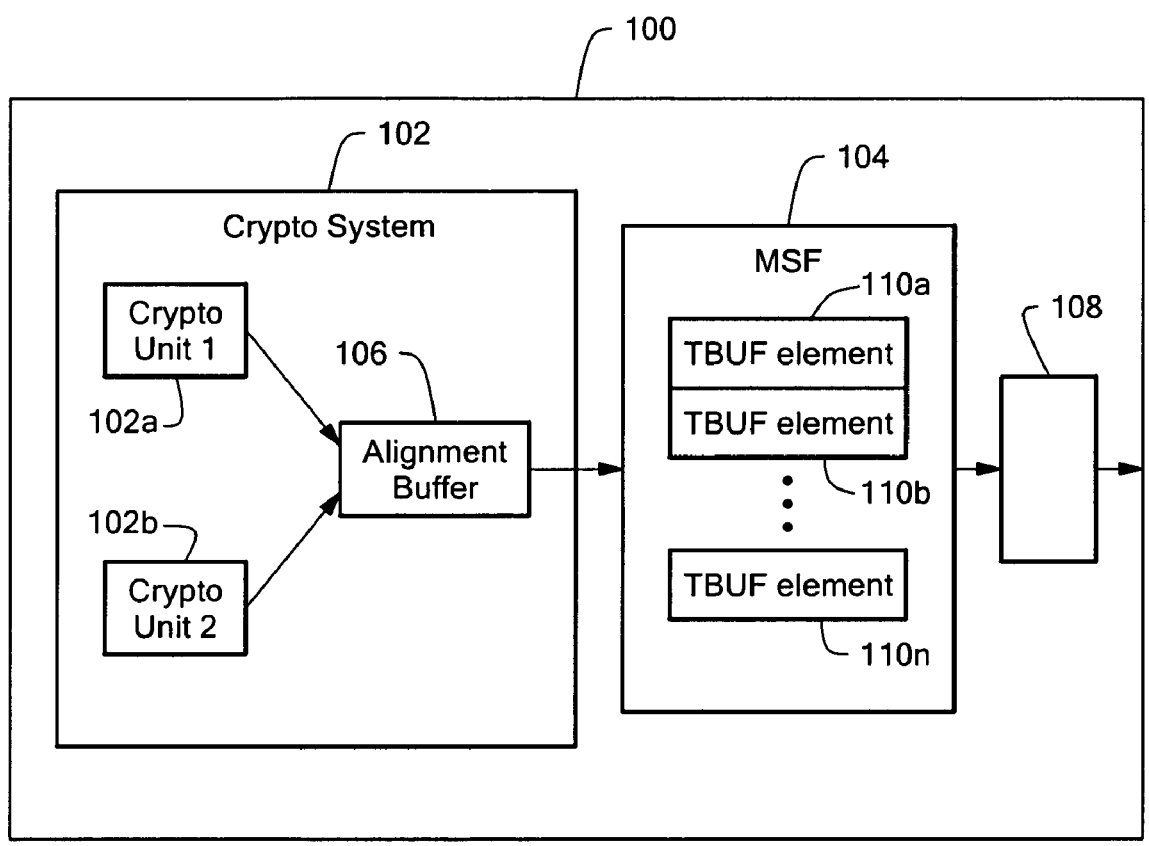
FIG. 1A is a schematic depiction showing further details of the cryptographic processing in the network processor of FIG. 1.

FIG. 1A shows an exemplary network processor 100 including a crypto system 102 having first and second crypto units 102a, 102b, an MSF unit 104 and an interface 108. The crypto system 102 includes an alignment buffer 106 for buffering data from the first and second crypto units 102a, 102b prior to transmission to the MSF unit 104. The MSF unit 104 contains a pool of transmit buffers (TBUF elements) 110a-110n, into which data to be transmitted over the interface 108 is written. The TBUF elements 110 can be configured to be 64 bytes, 128 bytes, or 256 bytes in length, for example. The data within each TBUF element 110 corresponds to a so-called mpacket so the length of the data written to any TBUF element is a multiple of 16 bytes unless the TBUF element contains the end of a packet.

The crypto units 102a, 102b accelerate the cryptographic processing of packet data to support crypto processing at line rate. In an exemplary embodiment, the crypto units 102 implement the following cipher algorithms: 3DES/DES, AES, and RC4. The 3DES/DES and AES algorithms are block cipher algorithms, which means that they process data in discrete blocks. The block size of the 3DES/DES algorithm is 8 bytes and the block size of the AES algorithm is 16 bytes. The RC4 algorithm is a stream cipher that processes data one byte at a time.

In one particular embodiment, the crypto units 102a, 102b each implement the following well-known authentication algorithms: MD5, SHA1, and AES-XCBC-MAC, which are block-oriented algorithms. The MD5 and SHA1 algorithms have a block size of 64 bytes, while the AES-XCBC-MAC algorithm has a block size of 16 bytes.

Figure 1B:
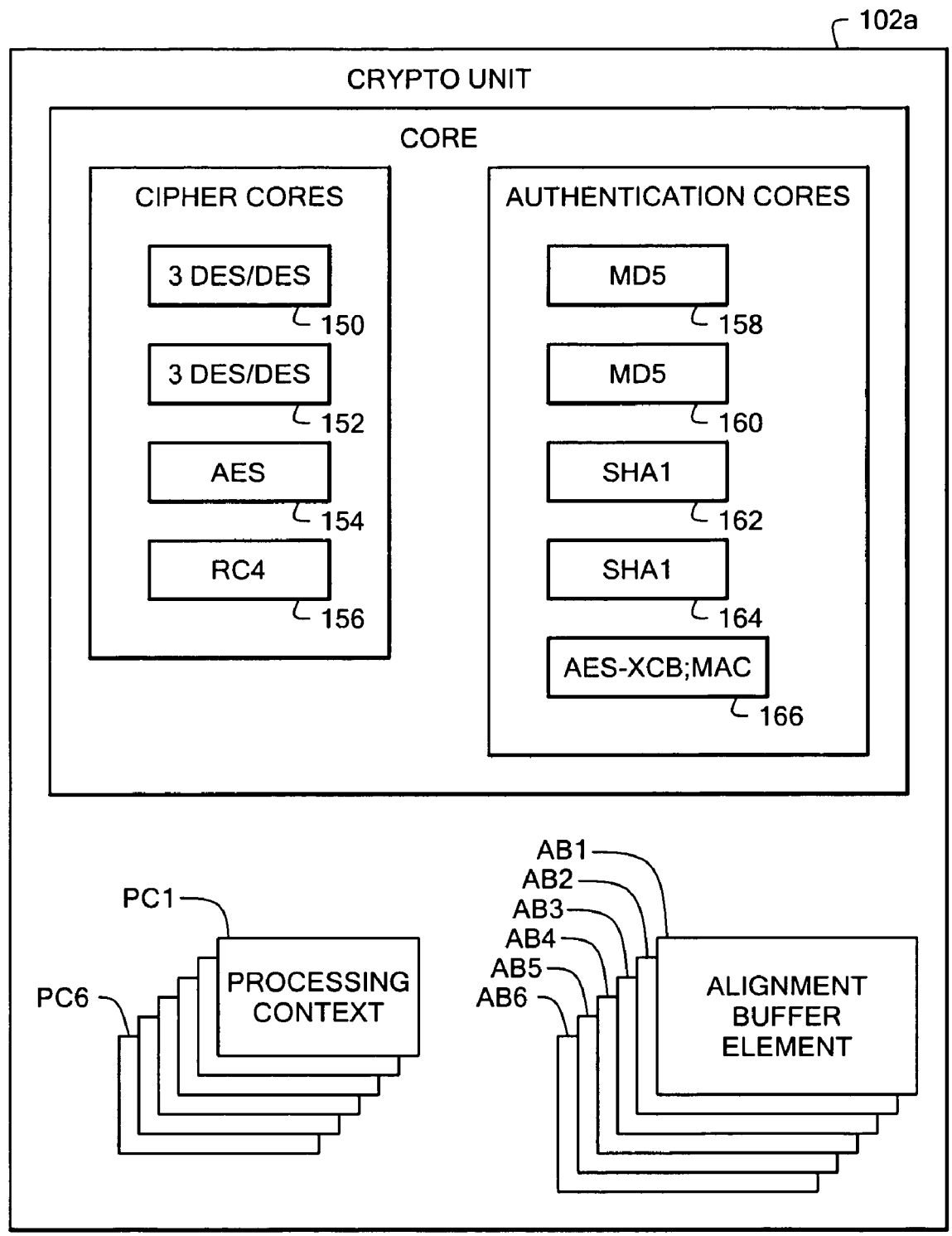
FIG. 1B is a schematic depiction showing additional details of the cryptographic processing in the network processor of FIG. 1.

In an exemplary embodiment shown in FIG. 1B, the crypto unit 102a has six alignment buffer elements AB1-AB6 and a core containing four cipher cores: two 3DES/DES cores 150, 152, an AES core 154, and an RC4 core 156, and five authentication cores: two MD5 cores 158, 160, two SHA1 cores 162, 164, and an AES-XCBC-MAC core 166. In order to support the ciphering of relatively small packets, the crypto units 102 each have six processing contexts PC1-PC6, which are each used to process one packet at a time. Each processing context PC contains storage for the cipher keys and algorithm context associated with the processing of one packet. Multiple processing contexts allow the latency of loading cryptographic key material and packet data to be hidden by pipelining the loading of data and key material into some of the contexts with the processing of data in other contexts. This allows the crypto unit to achieve close to full utilization of the cipher and authentication cores.

Referring again to FIG. 1A, in operation, data is processed by the crypto units 102a, 102b and the ciphered data is sent from the crypto units through the alignment buffer 106 to the MSF unit 104 for transmission over the SPI4.2/NPSI interface 108. The cipher cores process data in 8 or 16 byte blocks using the 3DES/DES or AES cipher algorithms, respectively. The beginning of the security protocol header, which precedes the encrypted data, is not ciphered. This part of the header may not be a multiple of 16 bytes, so as the 8 or 16 byte data blocks that are output by the cipher cores are sent to the TBUF elements 110, all of the data from the last block that fits into a given TBUF element may cause the TBUF element to contain data having a length that is not a multiple of 16 bytes. In this case, the data for this packet is split across the current TBUF element and the next TBUF element. The alignment buffer 106 aligns the data going to the TBUF elements 110 on the correct 16 byte boundary and stores leftover data that can then be written to the next TBUF element, as described further below.

Figure 2:
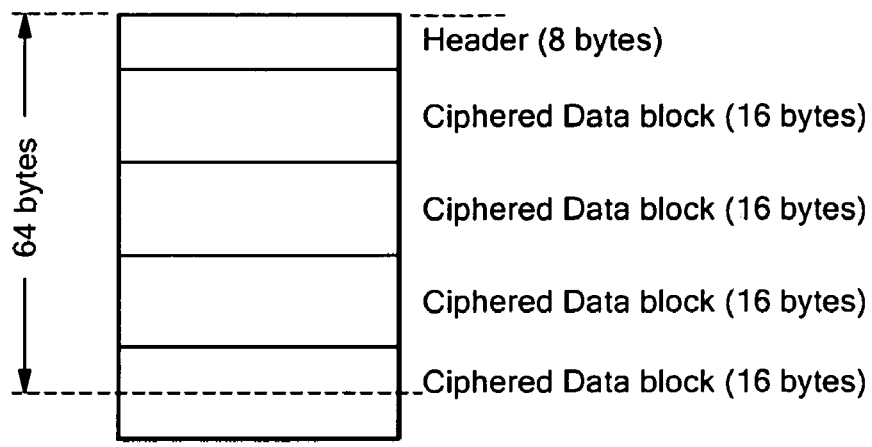
FIG. 2 is a pictorial representation showing data in the alignment buffer of FIG. 1.

FIG. 2 illustrates how an exemplary packet for which a ciphered block is split in order for the number of bytes in the TBUF element to be a multiple of 16 bytes. When the cipher block is split across two TBUF elements a residue can be handled by an alignment buffer 106 (FIG. 1). An exemplary packet includes an 8 byte header that has been ciphered using the AES algorithm, which produces output data in 16 byte blocks. Assuming a 64 byte TBUF element 110 (FIG. 1), there is space in the TBUF element to hold the 8 byte header and 3.5 (indicated by the dashed line) of the four 16 byte blocks. If three of the 16 byte blocks are written to the TBUF element, then the length of the data contained within the buffer element is not a multiple of 16 bytes. Thus, the fourth block is split across multiple TBUF elements as indicated in order to meet the 16 byte multiple requirement. The alignment buffer 106 allows blocks of ciphered data that are destined for the TBUF elements 110 to be split across TBUF elements without requiring the data to be stored under software control.

Figure 3:
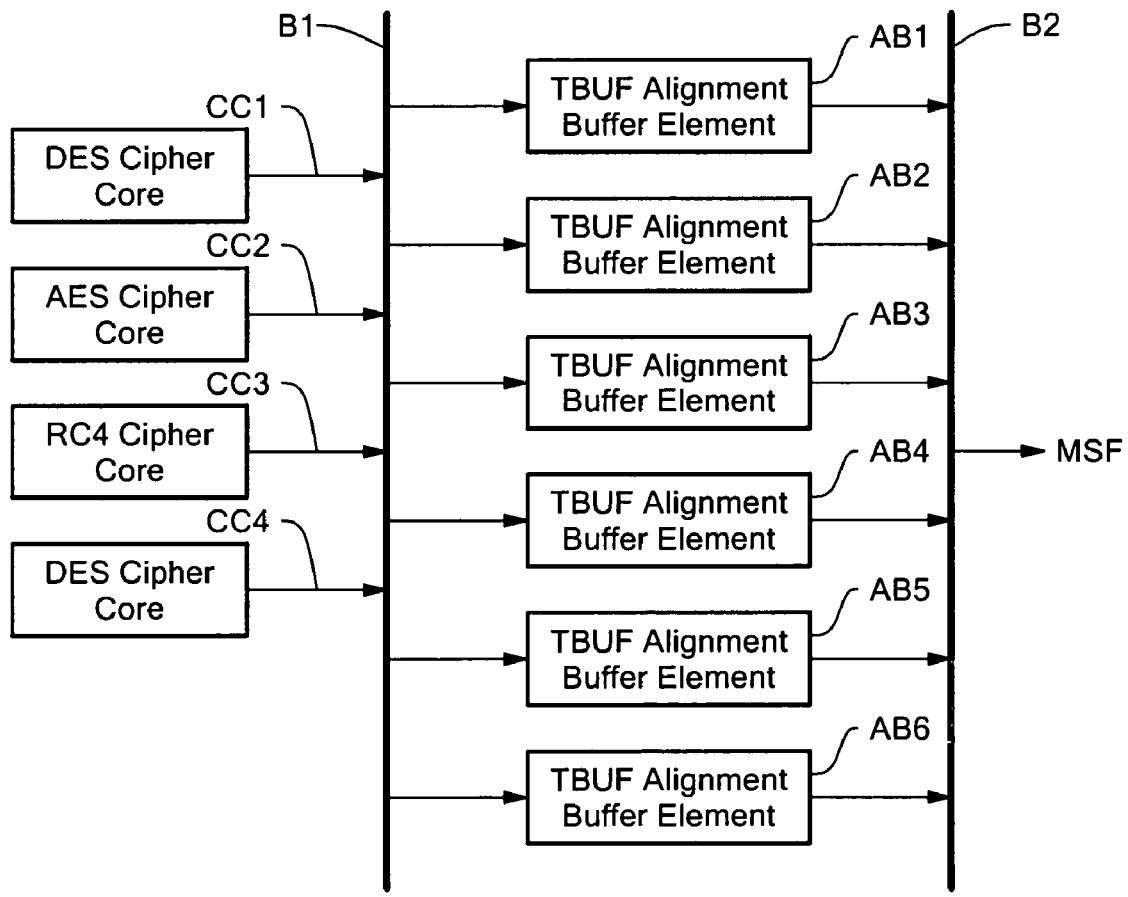
FIG. 3 is a schematic depiction of a exemplary arrangement of cipher cores and alignment buffers in accordance with the present disclosed embodiments.

In an exemplary embodiment shown in FIG. 3, there is a discrete alignment buffer element AB1-6 for each of the six crypto unit contexts. In one particular embodiment, each alignment buffer element is a FIFO (First In First Out) device that stores 15 bytes of data. Each of the cipher cores CC1-CC4 provides data to the alignment buffers AB1-6 via a first multiplexer circuit B1. As described above, the cipher cores can include first and second DES cipher cores CC1, CC4, an AES cipher core CC2, and a RC4 cipher core CC3. The alignment buffer elements AB1-AB6 can provide output data onto a second multiplexer circuit B2 for transmission to the MSF and/or authentication cores. Multiplexer circuits suitable for connecting the alignment buffer elements AB1-AB6 to the cipher cores and the MSF will be readily apparent to one of ordinary skill in the art. In addition, a variety of well-known circuit types can be substituted for the multiplexer circuits B1, B2.

Figure 4:
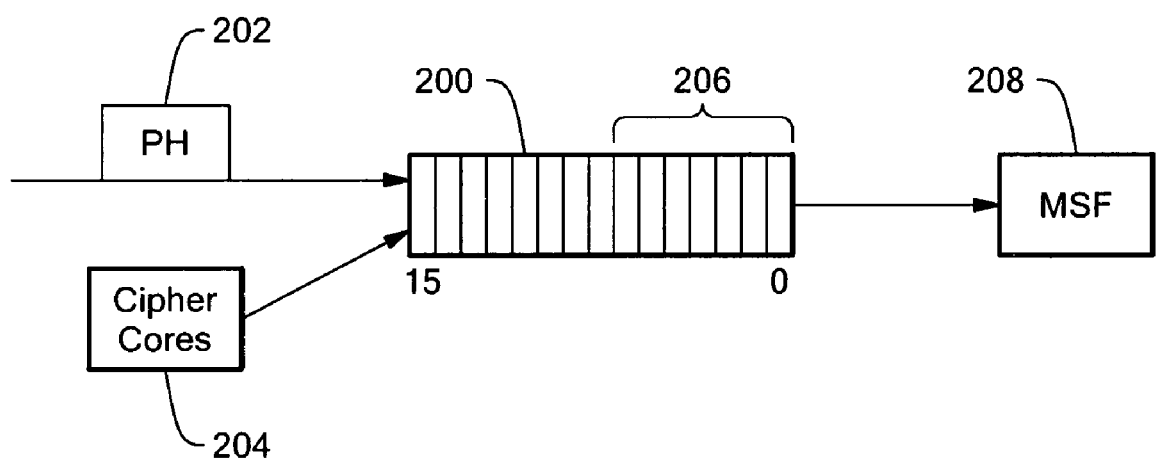
FIG. 4 is a schematic depiction showing further details of the alignment buffer element of FIG. 1.

FIG. 4 shows operation of an alignment buffer element 200 within the crypto unit. As described above, the alignment buffer element 200 can be provided as a 15 byte FIFO. Initially, between 1 and 15 bytes from a packet header 202 move directly into the alignment buffer element 200. A cipher core 204 then provides 8 or 16 byte data blocks to the alignment buffer element 200, which then provides 16 byte blocks to the buffer elements in the MSF unit 208. After a data transfer to the MSF unit 208, a residue 206 remains in the alignment buffer element 200 between receipt of ciphered data blocks. At the end of a packet, the data that remains in the buffer is flushed to the MSF unit 208 even though its length is not a multiple of 16 bytes.

It is understood that the alignment buffer can be provided in a variety of implementations and mechanisms well known to one of ordinary skill in the art. In one particular embodiment, the alignment buffer includes storage elements, such as flip-flops, to store the current residue. When new data arrives, a byte shifter can be used to align the new data with the current residue data. After alignment with a byte shifter, the data can be written info flip-flops.

Figure 5:
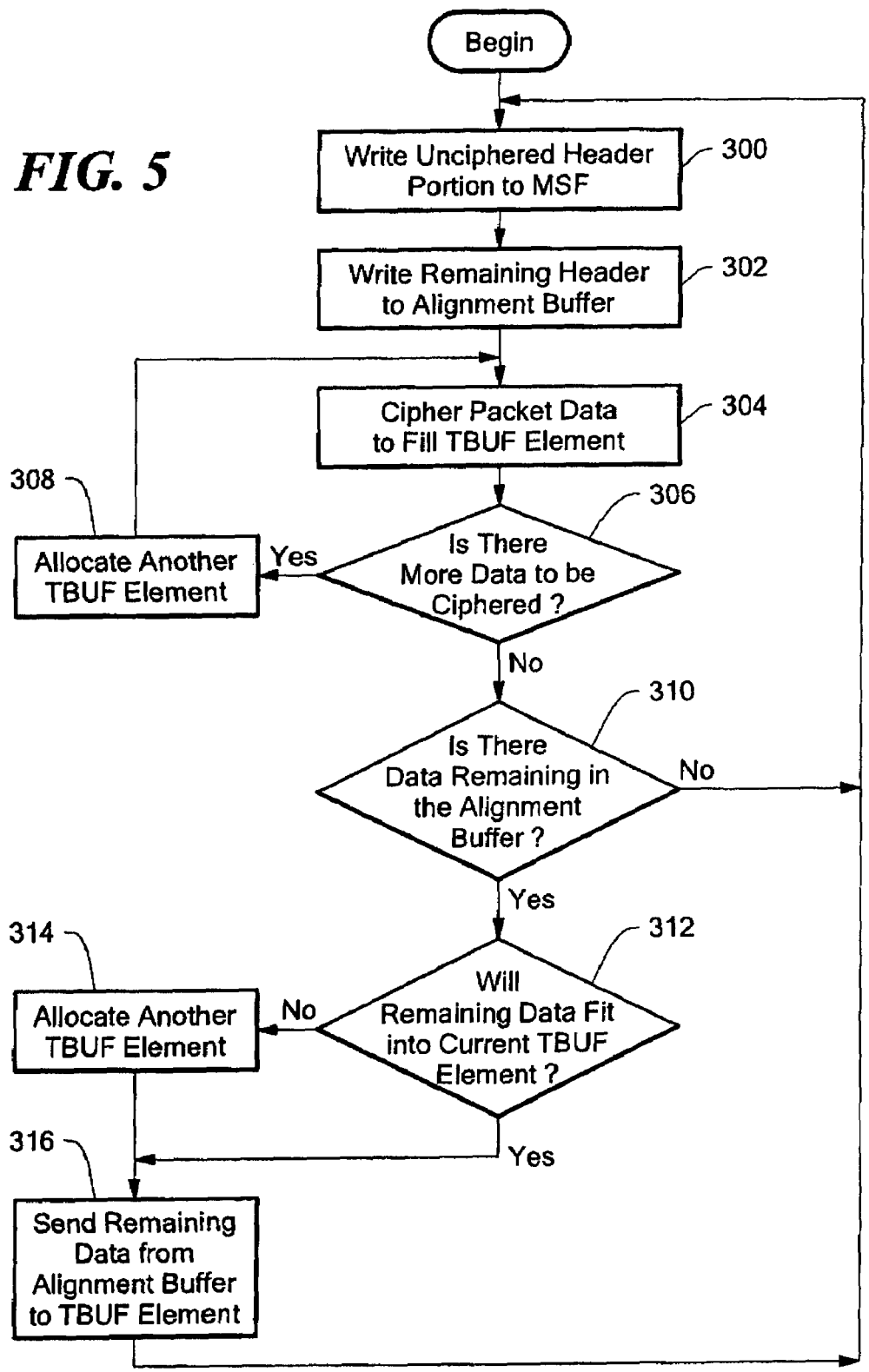
FIG. 5 is a flow diagram showing an exemplary sequence of processing blocks for implementing an alignment buffer in accordance with the presently disclosed embodiments.

FIG. 5, in combination with FIG. 1, shows an exemplary sequence of processing blocks for implementing alignment buffer operation in accordance with the presently disclosed embodiments. In processing block 300, at the start of a packet, a portion of the header that is not subject to ciphering and a multiple of 16 bytes is written directly into a TBUF element 110 within the MSF. It is understood that this operation may not involve the crypto units. In processing block 302, the remainder of the header is loaded into the alignment buffer 106, which receives between 1 and 15 bytes of unciphered header data. The amount of data received can be programmable.

In processing block 304, the crypto unit 102 ciphers packet data to fill the given TBUF element 110. The starting address in the MSF 104 is passed along on each cipher command. Ciphered data is fed through the alignment buffer 106 and sent to the MSF 104 in blocks of 16 bytes, so the amount of valid data in the TBUF element is a multiple of 16 bytes.

When a TBUF element has been filled, it is determined in decision block 306 whether there is still data to cipher (whether or not the packet has been completely processed). If not, it is determined in decision block 310 whether there is any data remaining in the alignment buffer. If there is no remaining data, processing of this packet is complete and processing of the next packet can be started in processing block 300. If there is data remaining, it is determined in decision block 312 whether this data will fit into the current TBUF element. If this data will fit, in processing block 316 the data is sent to this TBUF element and processing of the next packet can be started in processing block 300. If the data in the alignment buffer will not fit in the current TBUF element, in processing block 314 a new TBUF element is allocated. The data remaining in the alignment buffer is then sent to the TBUF element (processing block 316) and processing of the next packet can be started in processing block 300. The data that remains in the alignment buffer 106, which is at or between 0 and 15 bytes, is sent to the MSF in processing step 316 even though it is not a complete 16 bytes. While this may result in an amount of data in the TBUF element that is not a multiple of 16 bytes, this is allowed by the SPI4.2 and NPSI protocols, for example, at the end of a packet. With these protocols, software indicates the correct length when validating the last TBUF element, so that the MSF unit sends out the correct number of bytes at the end of the packet.

If packet processing is not complete as determined in decision block 306, in processing block 308 an additional TBUF element is allocated. The crypto unit 102 then ciphers more packet data to fill the additional TBUF element in processing step 304.

Figure 6:
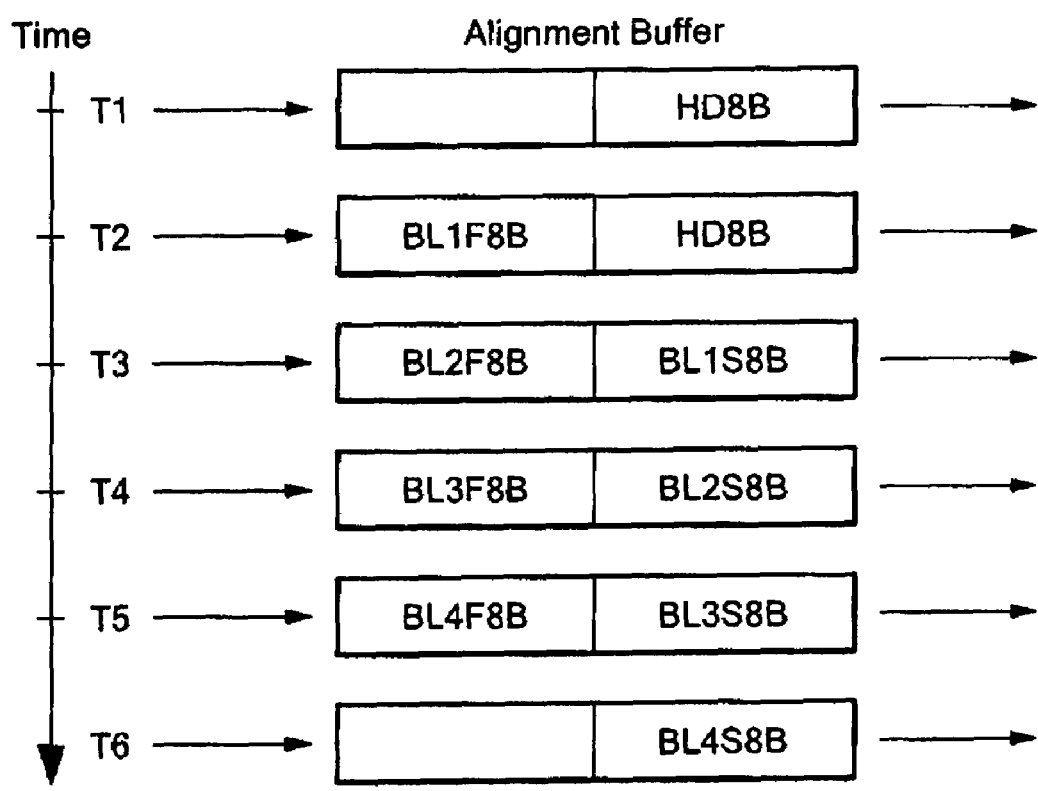
FIG. 6 is a pictorial representation showing the contents of an alignment buffer over time in accordance with the presently disclosed embodiments.

FIG. 6 shows the flow of data over time through a 16 byte alignment buffer element for four 16 byte data blocks using the exemplary packet size described above in conjunction with FIG. 2. The 8 bytes of header HD8B are first loaded into the alignment buffer element. Since this is less than 16 bytes, these 8 bytes HD8B remain in the alignment buffer element waiting for more data. At this point, four 16 byte blocks of data are ciphered by a crypto unit, with the output going to a specified TBUF Element. When the first of these blocks arrives at the alignment buffer element, the first 8 bytes of the first block BL1F8B together with the 8 header bytes HD8B already in the alignment buffer element make a 16 byte block, which is sent to the TBUF element. The second 8 bytes of the first block BL1S8B are stored in the alignment buffer element. The first 8 bytes of the second block BL2S8B then enter the alignment buffer element until transmission to the MSF unit, and so on for the third and fourth data blocks. At the end of this operation, the four 16 byte blocks have been loaded into the TBUF element, and the second 8 bytes of the fourth block BL4S8B remain in the alignment buffer element. This last byte BL4S8 is written to the next TBUF element when another block of data from the packet is ciphered unless it is the last 8 bytes of the packet in which case the 8 bytes are written to the next TBUF element using the flush command.

Figure 7:
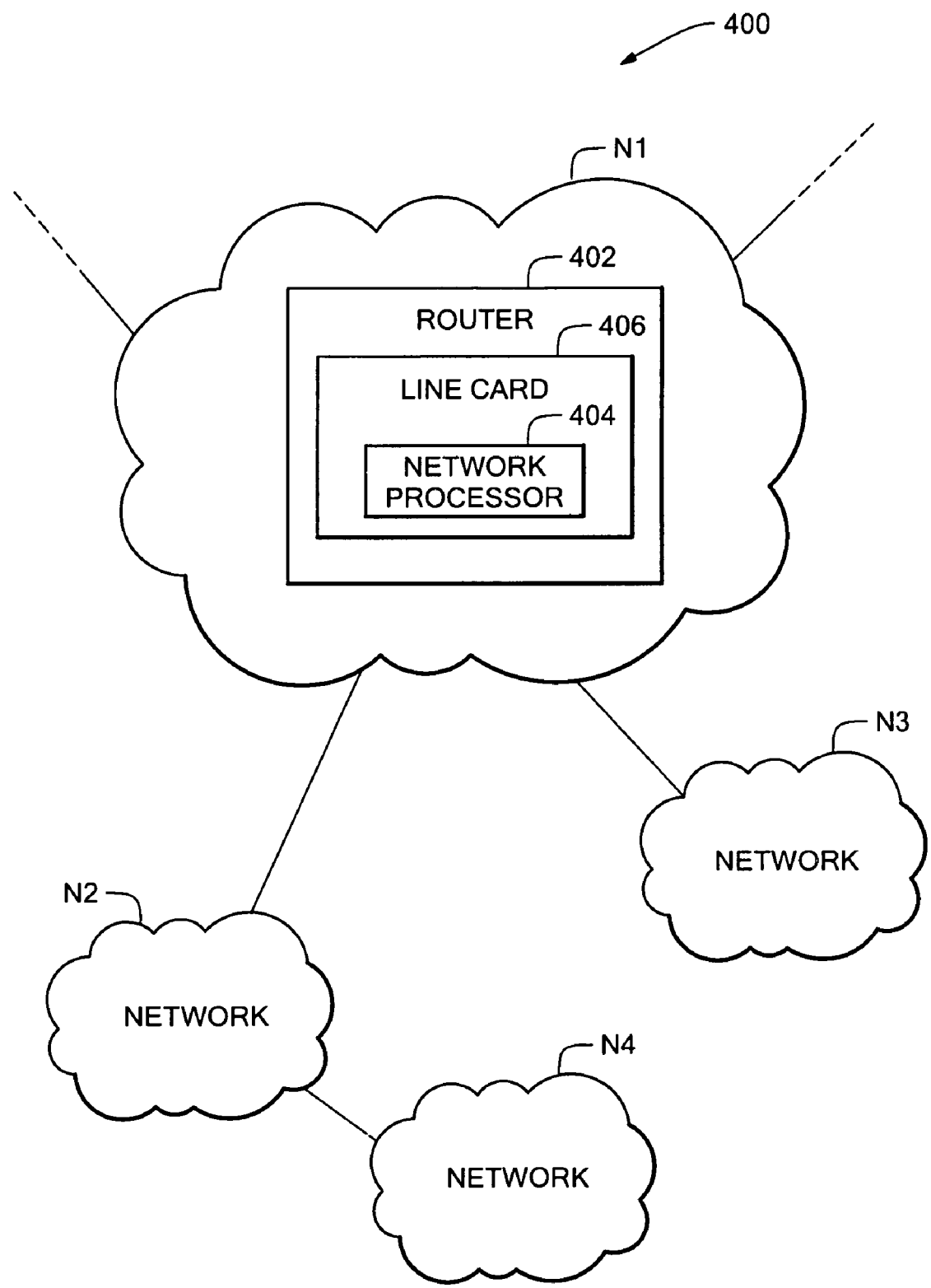
FIG. 7 is a schematic depiction of a network system having a device with a network processor with an alignment buffer in accordance with presently disclosed embodiments.

FIG. 7 shows an exemplary system 400 including a first network N1 having a switching device 402 with a network processor 404 containing an alignment buffer as described above. The network processor 404 can form a part of a line card 406 with the switching device 402. The switching device 402 can be coupled to other networks N2, N3, N4 . . . , in a manner well known in the art.

It is understood that the switching device can be provided from a variety of devices that include cryptographic data processing, such as a network router. Various network applications, configurations, switching devices, and topologies for the network and network processor will be readily apparent to one of ordinary skill in the art.

The embodiments described above provide a way to eliminate the need for software control over the process of splitting ciphered data blocks across TBUF elements thereby saving processing cycles and bus bandwidth. This arrangement also provides a cleaner programming model since the program does not have to distinguish between blocks that fit into a TBUF element and blocks that do not fit. In addition, buffer alignment is programmable for supporting various security protocols and encapsulation protocols having a variety of differently sized packet headers, which are not subject to ciphering.

While the embodiments described herein are primarily shown and described in conjunction with an Intel IXP2850 network processor architecture, it is understood that embodiments are applicable to network processors in general. For example, it will be appreciated that any number of crypto units can be used. In addition, the number of cipher and authentication cores and processing contexts, as well as the supported algorithm types, can vary without departing from the scope of the present embodiments.

One skilled in the art will appreciate further features and advantages based on the above-described embodiments. Accordingly, the embodiments described herein are not to be limited by what has been particularly shown and described, except as indicated by the appended claims. All publications and references cited herein are expressly incorporated herein by reference in their entirety.

What is claimed is:

1. A processor, comprising:
a crypto system;
an alignment buffer to receive header data and ciphered data from the crypto system, the crypto system encrypting data to form ciphered data so that an intended receiver with a correct cryptographic key may decrypt the ciphered data; and
a switch fabric having a plurality of transmit buffer elements to receive data from the alignment buffer, wherein the alignment buffer provides data to the switch fabric in blocks having a predetermined size,
wherein the crypto system comprises a plurality of crypto unit processing contexts and the alignment buffer comprises a number of buffer elements equal to a number of processing contexts, and
wherein the plurality of processing contexts are configured to process at least one data packet at a time and to store cipher keys and algorithm context associated with processing the at least one data packet.

2. The processor according to claim 1, further including an interface to transmit data from the switch fabric.

3. The processor according to claim 2, wherein the interface includes a SPI4 type interface.

4. The processor according to claim 2, wherein the interface includes an NPSI interface.

5. The processor according to claim 1, wherein the crypto system includes first and second crypto units.

6. The processor according to claim 1, wherein the crypto system includes a plurality of cipher cores.

7. The processor according to claim 6, wherein the plurality of cipher cores correspond to a plurality of cipher algorithms.

8. A network switching device, comprising:
a processor disposed on an integrated circuit comprising:
a crypto system, the crypto system encrypting data to form ciphered data so that an intended receiver with a correct cryptographic key may decrypt the ciphered data, the crypto system comprises a plurality of crypto unit processing contexts and the alignment buffer comprises a number of buffer elements equal to a number of processing contexts;

an alignment buffer to receive header data and the ciphered data from the crypto system; and a switch fabric interface unit having a plurality of transmit buffer elements to receive the ciphered data from the alignment buffer, wherein the alignment buffer provides the ciphered data to the switch fabric in blocks having a predetermined size, wherein the plurality of processing contexts are configured to process at least one data packet at a time and to store cipher keys and algorithm context associated with processing the at least one data packet.

9. The device according to claim 8, wherein the crypto system includes a plurality of cipher cores, wherein the plurality of cipher cores correspond to a plurality of cipher algorithms.

10. The device according to claim 8, wherein the device includes a router.

11. A network, comprising:

a network switching device including a processor disposed on an integrated circuit comprising:

a crypto system, the crypto system encrypting data to form ciphered data so that an intended receiver with a correct cryptographic key may decrypt the ciphered data;

an alignment buffer to receive header data and the ciphered data from the crypto system; and a switch fabric interface unit having a plurality of transmit buffer elements to receive the ciphered data from the alignment buffer, wherein the alignment buffer provides the ciphered data to the switch fabric in blocks having a predetermined size, wherein the crypto system comprises a plurality of crypto unit processing contexts and the alignment buffer comprises a number of buffer elements equal to a number of processing contexts, and wherein the plurality of processing contexts are configured to process at least one data packet at a time and to store cipher keys and algorithm context associated with processing the at least one data packet.

12. The network according to claim 11, wherein the crypto system includes a plurality of cipher cores.

13. The network according to claim 11, wherein the network switching device corresponds to a router.

* * * * *